Inventor
WALTER L. EDEL

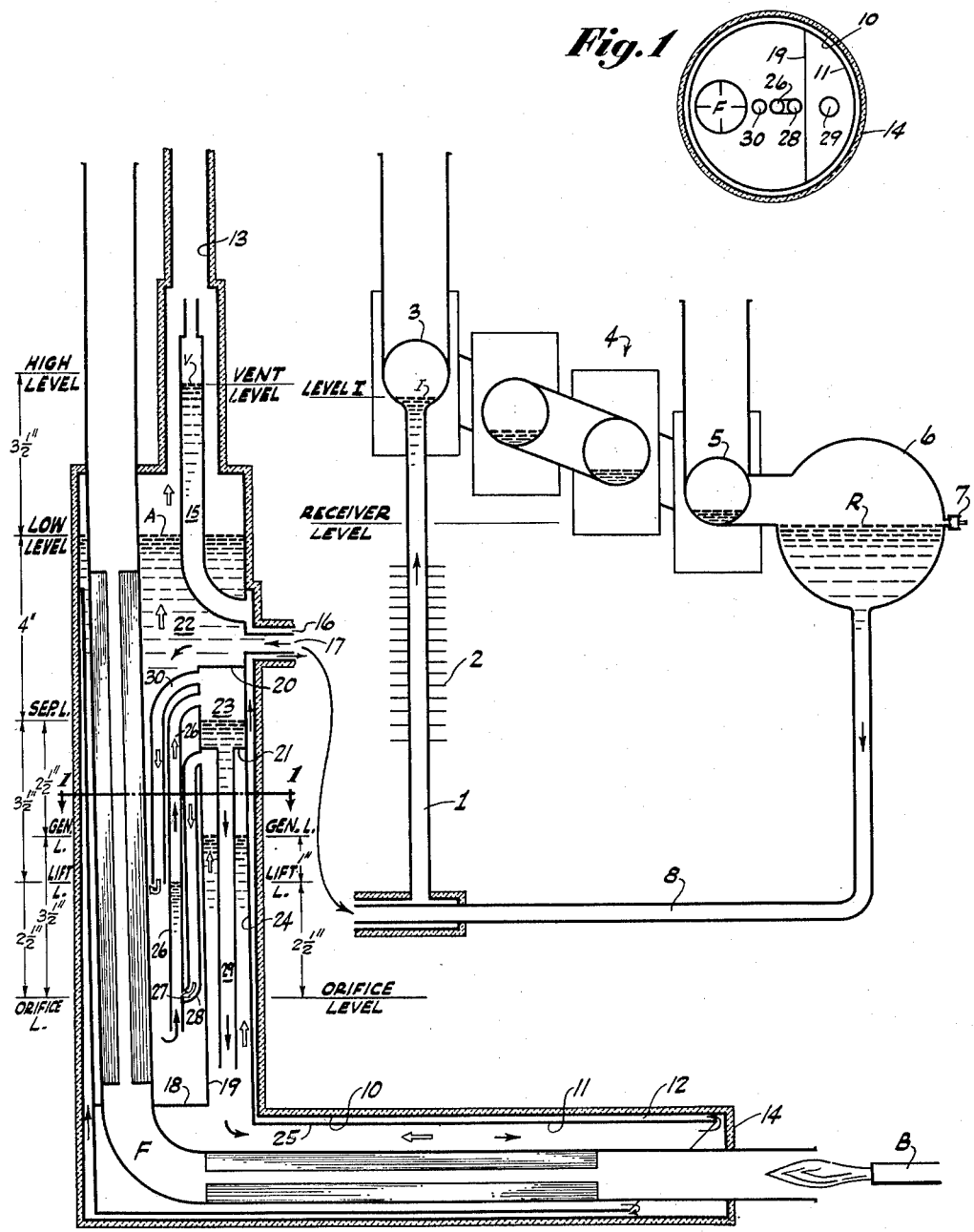

By Arthur H. Robert
Attorney

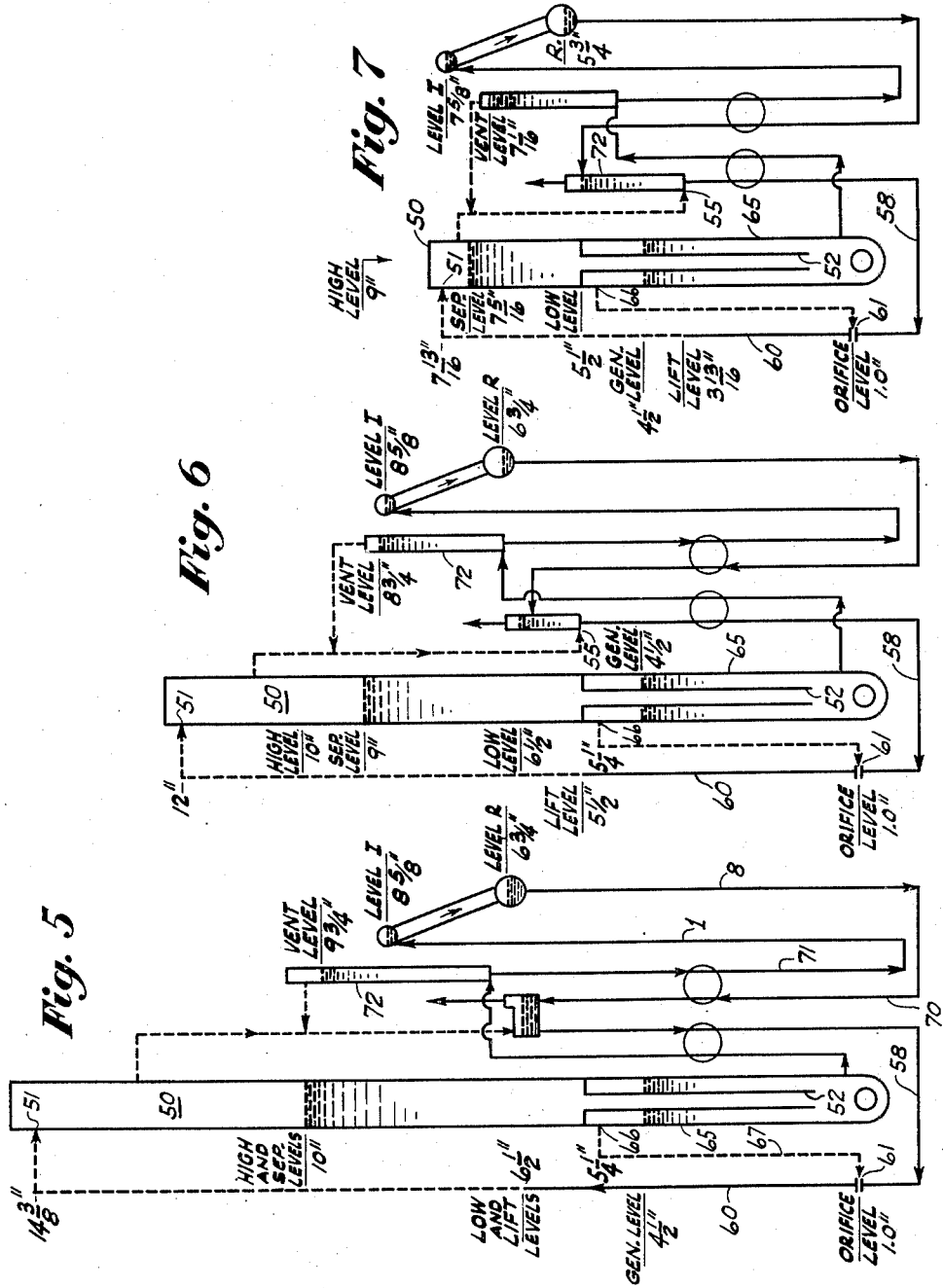

Patented Dec. 30, 1952

2,623,366

UNITED STATES PATENT OFFICE 2,623,366

GENERATOR ASSEMBLY APPARATUS FOR UNIFORM PRESSURE ABSORPTION TYPE REFRIGERATORS

Walter L. Edel, Louisville, Ky., assignor to Clayton & Lambert Manufacturing Company, Louisville, Ky., a corporation of Delaware Application June 13, 1949, Serial No. 98,722

23 Claims. (Cl. 62—119.5)

This invention relates to improvements in uniform pressure absorption type of refrigerating apparatus and has particular reference to the generator assembly for generating vapor and circulating liquor to and from the absorber. This application is a continuation in part of my application, Serial No. 744,202, filed April 26, 1947.

One important object of the invention is to provide a novel generator assembly of simple and inexpensive form having a highly efficient heat transfer characteristic.

Another important object is to provide such an assembly with a lift arrangement which utilizes the generated vapor to lift the strong liquor upwardly into a separator and which is so arranged as to insure the proper flow relationship between the generated vapor and the lifted strong liquor.

Another important object is to provide a novel generator assembly which utilizes vapor pressure to supplement the liquid head normally provided to effect a circulation of liquor back to the absorber inlet.

Another important object is to provide, in the generator-absorber liquor circulating system, a novel generator arrangement which enables the over-all elevation of the generator assembly to be reduced to a substantial degree, which may be so utilized as to permit a reduction in the overall elevation of the absorber assembly, and which insures an effective return flow of liquor to the absorber assembly.

Another important object is to provide a generator assembly which, when properly charged with liquid and gas and then inverted, will automatically recharge itself for proper operation when restored to an upright position.

The invention is illustrated in the drawings wherein:

Figure 1 is a cross-sectional view of reduced scale taken along line 1—1 of Figure 2;

Figure 2 is a more or less schematic view of a vertical section through a circulating system having a generator assembly constructed in accordance with this invention;

Figure 3:
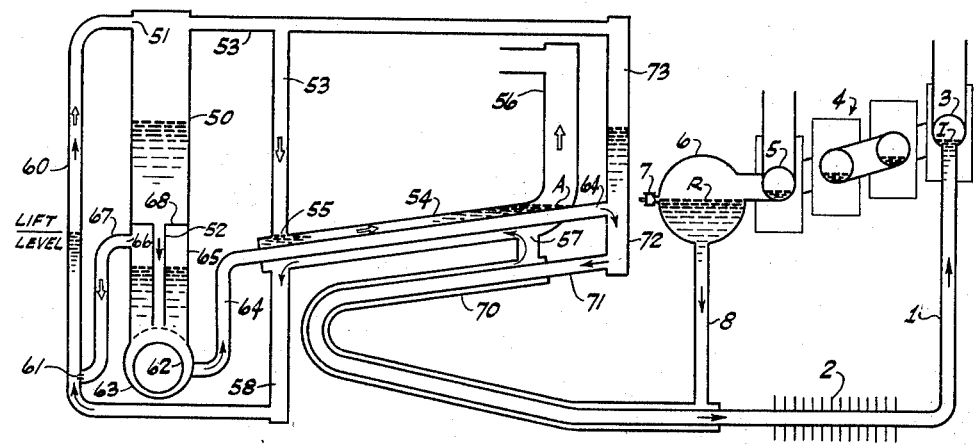
Figure 3 is a schematic view showing the layout of another embodiment constructed in accordance with this invention.
Figure 4:
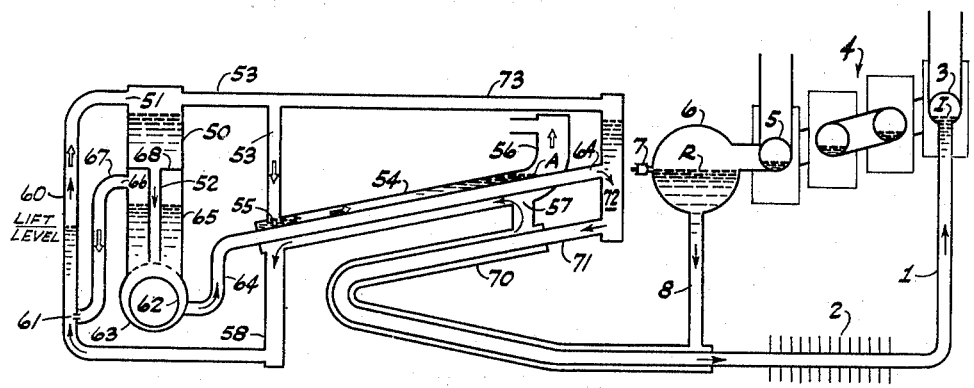

Figure 4 is a view, similar to that of Figure 3, showing a slightly different embodiment of the invention; and Figures 5, 6 and 7 are schematic views based on Figures 3 and 4 respectively, Figure 5 showing the height of the generator assembly of Figure 3 when vapor pressure is not used in effecting a return flow of liquor to the absorber, Figure 6 showing the reduction in the height of the same generator assembly when vapor pressure is used to supplement the liquid head favoring the return flow of liquor to the absorber, and Figure 7 showing the greater reduction of height of the generator assembly and a reduction in the height of the absorber assembly, obtained with the higher supplementary vapor pressure design of Figure 4.

The generator assemblies illustrated in Figures 2-4 operate to generate and analyze vapor and to circulate liquor to and from an absorber assembly which comprises an incoming weak liquor conduit 1 extending through an air-cooler 2 into the inlet section 3 of an absorber 4 having an outlet section 5 which discharges into a receiver 6 provided with a charging plug 7 at its charging level and a strong liquor discharge conduit 8.

Generator assembly structure of Figure 2

This generator assembly comprises: an outer and preferably L-shaped shell 10; an inner shell 11 of similar L-shape which is spaced inwardly from the outer shell and arranged to provide an inner chamber within the inner shell, and an outer chamber 12 between the outer and inner shells 10 and 11, this outer chamber 12 being in open communication with the inner chamber at the hot end or toe of the assembly, and being closed at its upper end where the two shells 10 and 11 meet; a shell extension 13 continuing one of the shells upwardly beyond the upper end of the outer chamber and providing an upward extension of the inner chamber which leads to the refrigerant condenser (not shown); insulation 14 covering the outer shell 10 and the shell extension 13; a vent connection 15 leading upwardly through the inner chamber from the upper end of the outer chamber, this connection venting, to the condenser, any gases or entrained vapor that may accumulate in the outer chamber; and a heat exchange connection spaced slightly below the horizontal plane of the lower end of the vent connection 15, this heat exchange connection comprising an outgoing weak liquor conduit 16 connected to the outer chamber and in heat exchange relationship with an incoming strong liquor conduit 17 connected to the inner chamber.

The vertical leg of the inner chamber contains, between its lower end and the heat exchange connection, four partitions as follows: a horizontal bottom partition 18 which extends from the heel of the inner chamber transversely across part of the cross-sectional area of the inner chamber; a vertical partition 19 which extends from the inner edge of the lower partition 18 upwardly and transversely across the inner chamber to a point just below the heat exchange connection; an upper horizontal partition 20 which extends from the upper end of the vertical partition 19 transversely across the remaining cross-sectional area of the inner chamber; and a horizontal partition 21 corresponding to but spaced somewhat below the upper partition 20. These partitions divide the inner shell into: a strong liquor compartment 22 lying above the bottom partition 18 and communicating with the incoming strong liquor conduit 17; a submerged separator 23 lying between partitions 20 and 21 and having an operating liquid or separator level with a closed vapor space above that level; and a submerged generator having a vertical standpipe 24 extending downwardly from the partition 21 and a horizontal base 25 extending through the foot of the inner shell. The generator is normally filled with liquid up to an operating liquid or generator level in the standpipe 24 and has a closed vapor space over that level and under partition 21. The generator may be heated in any suitable way and it is shown as having a burner B at its toe end and a combustion flue F extending through the base section 25 and then turning upwardly to pass successively through partition 18 and compartment 22.

A strong liquor lifting conduit 26 extends from the lower end portion of compartment 22 upwardly to connect into the separator vapor space. This conduit has a vapor inlet orifice 27, which should be located on a level approximately 1" or more above the lowest point to which the vapor entering the orifice must travel to reverse its normal upward direction of flow. A lower orifice may permit the vapor to reverse and flow downwardly into compartment 22. The generator assembly structure is completed by conduit means which comprise: a conduit 28 for feeding generated vapor under pressure downwardly from the generator vapor space into the lifting orifice 27 to lift strong liquor through the lifting conduit 26 into the separator vapor space; a conduit 29 for conducting a solid column of down-flowing strong liquor from the separator and discharging it into the generator at a level below the generator level; and a conduit 30 for conducting separated vapor under pressure from the separator vapor space downwardly through compartment 22 to a discharge point, at a level between the separator level and the lift orifice 27, where it discharges into compartment 22.

Liquid flow of Figure 2

The liquor circulates in Figure 2 downwardly through the absorber 4, receiver 6 and conduit 8, upwardly through the heat exchanger conduit 17, downwardly through compartment 22, upwardly through lift conduit 26, downwardly through the separator 23 and generator sections 24 and 25, upwardly through the outer chamber 12, downwardly through the heat exchanger conduit 16 and upwardly through the weak liquor conduit 1 back to the inlet of the absorber.

The circulating system of Figure 2 comprises: a low level circuit beginning with receiver level R and ending with compartment 22 level A and a high level circuit beginning with a downflow column in the high circuit separator 23 and ending with an upflow column forming the absorber inlet I. The liquor overflows at level I to run downward gravitationally through the absorber assembly from the high circuit to the low circuit. In the generator assembly, the liquor must be lifted from a low level in the low circuit to a high level in the high circuit.

The high level of Figure 2

The high level required to effect an unforced gravitational flow through the high circuit is indicated in Figure 2 by the legend "High Level." This high level must be slightly higher than the vent level V, in order that the weight of the lighter strong liquor forming the high circuit downflow column may overcome the weight of the heavier column of weak liquor forming the vent level V and thus cause the liquor to flow from the high level to the vent level which, in turn, must be slightly higher than the absorber level I in order to overcome the flow resistance of the heat exchanger between levels V and I.

The lift height of Figure 2

The vertical distance between the low level A and the high level is herein called the lift height. In Figure 2 we assume that the high level stands 3½" above the low level; hence the lift height is 3½". It will now be obvious that liquor must be pumped from the low level A into the high circuit separator to build the level of the downflow column up to a point where the 3½" lift height is created between such levels. When this is done the high circuit flow will be instituted at a rate corresponding to the rate at which liquid is pumped from the low circuit to the high circuit.

The depressed levels

In accordance with my invention, the high level of the high circuit is depressed to a low separator level and low level liquid of the low circuit is equally depressed to a lift level by building up a vapor pressure or vapor head in the high circuit separator vapor space. Since both liquids are depressed to the same extent by the same vapor pressure, the lift height remains unchanged; hence the depressed low circuit liquid must be lifted into the high circuit separator 23 until the depressed separator level stands the lift height above the lift level of the depressed low level liquid before a flow through the high circuit will be instituted. Furthermore since the vapor pressure in high circuit equals the hydrostatic pressure of the liquid it displaces, the hydrostatic pressure of the depressed downflow column necessarily remains the same as the hydrostatic pressure of a non-depressed downflow column.

Separator vapor pressure

The separator vapor pressure can be built up by appropriately restricting the flow of separated vapor from the separator into the vapor space of the shell extension 13. It is conveniently and advantageously effected by discharging the vapor leaving the separator into the liquid of compartment 22 at a desired point below the low level A.

In Figure 2 we assume that the high level is depressed 7½" to the separator level. Accordingly, the separator is made to discharge its vapor against the 7½" hydrostatic head of the low level liquid; hence it must build up a vapor pressure equal to such head before the vapor discharge can begin. In effect, I have superposed 7½" of hydrostatic head from the low circuit compartment 22 liquid onto the high circuit separator liquid through the agency of a vapor connection between them.

The lift mechanism

Since the assumed separator level stands 7½" below the high level, the lift level, formed by the depressed low level liquid, will also stand 7½" below the low level A. In other words the lift level in lift tube 26 stands at the same elevation as the vapor inlet of compartment 22 where the vapor leaves conduit 30 to enter compartment 22.

The liquid is lifted from the lift level through the lift conduit into the separator vapor space by directing vapor from the generator vapor space into the lift conduit at an orifice level sufficiently below the lift level to allow the generator level to stand the lift height distance above the orifice level. The generator level can therefore be made to stand at any selected elevation so long as the orifice 27 can be located the lift height distance below it. However, the generator level must be below the generator vapor outlet and above its strong liquor inlet. Accordingly the orifice 27 is preferably located at an elevation such as to cause the generator level to stand about ¾" below the generator vapor outlet.

With this assumed 3½" arrangement, the generator will build up a vapor pressure equal to the hydrostatic pressure created by the hydrostatic head between the orifice and the low level A. This head equals 10" in Figure 2. When this pressure is reached, generated vapor will enter the lifting conduit and lift liquor through that conduit into the separator.

Lift conduit flow ratio R

Theoretically the securement of the best operating results requires the lifting of a definite amount of strong liquor by all of the vapor generated from an equal amount of liquor. In other words, there is a proper flow relationship between the amount of strong liquor lifted and the amount of vapor generated and this relationship should be established to obtain the best operating results under all conditions of operation.

I have found that this flow relationship varies with the ratio of the distance between the orifice 27 and the lift level to the distance between the lift level and the level at which the lifted liquid is raised before it enters the separator. My experience indicates that, with the lifting conduit of substantially uniform bore, this ratio, which is herein called ratio R, should not go substantially above .80 or substantially below .60 and that good results may be uniformly expected when ratio R approximates .70.

In accordance with my invention the flow ratio R is incorporated in the lift conduit and, in Figure 2, this ratio approximates .60 to .625.

Charging and operating Figure 2

It will be appreciated that when the absorber and generator assemblies are exhausted and then charged with strong liquor followed by a charge of hydrogen gas, the liquor will flow into and fill compartment 22 and outer chamber 12 up to a level approximating level A, and, at the same time, completely fill the generator, separator and conduits 26, 28 and 30. When heat is applied vapor will be generated in generator 24 and as the pressure builds up the liquid will be forced downwardly through conduit 28 until the vapor pressure at the orifice 27 equals the hydrostatic head of the liquid between orifice 27 and level A. At this time vapor will pass upwardly through conduit 26 into separator 23.

As the pressure builds up in separator 23, it forces the liquid level in tubes 26 and 30 downwardly until it reaches the lower end of tube 30 when the separator vapor pressure will equal the 7½" hydrostatic head of the liquid between the lower end of conduit 30 and level A. If the appropriate generator, separator and vent levels have not been reached at this time, the system will continue lifting liquid into the separator to build up levels until the separator reaches the normal operating or separator level which, in conjunction with the separator vapor pressure already established, is required to force liquor up to the vent level and to thus initiate the flow to the absorber.

It will be appreciated that the arrangement of Figure 2 is highly efficient in operation from a heat transfer standpoint. Efficient operation is secured in the generator assembly because: the generator and separator are submerged; the flue F, compartment 22, separator 23 and generator 24 and all contained within the inner shell and surrounded by the weak liquor chamber 12; the generated vapors are taken off at the cold end of the generator; and the weak and strong liquors are in good heat exchange relationship in the heat exchanger. Furthermore, by using the generated vapor to raise the strong liquor, I obtain a further transfer of heat resulting in an increase in the temperature of the strong liquor going to the generator and a decrease in the useless super-heat of the generated vapors, this later decrease being accomplished by a condensation of some of its water vapor content. A similar heat transfer is obtained when the separated vapors flow from conduit 30 upwardly through compartment 22, this portion of compartment 22 functioning as an analyzer.

Corresponding elements of Figures 2, 3 and 4

The generator assemblies of Figures 2, 3 and 4 contain corresponding elements which, in Figures 3 and 4, comprise: a separator 50 arranged to receive and separate strong liquor and generated vapor, said separator having a strong liquor operating or separator level and a closed vapor space over said separator level for accumulating separated vapors under pressure; an analyzer 54 arranged to receive and discharge a stream of strong liquor and to analyze separated vapor in said strong liquor from a vapor inlet 55 at a level substantially below the separator level elevation upwardly to an analyzed vapor outlet level A; a strong liquor lifting conduit 60 extending upwardly and connecting into the separator vapor space, said lifting conduit having a strong liquor operating or lift-level at the level of the analyzer vapor inlet 55 and a lifting vapor inlet orifice 61 below said lift-level; a generator 63 having an operating liquid or generator level at an elevation above that of said lifting orifice 61 and below that of said separator level, a closed vapor space over said generator level for accumulating generated vapor under pressure and a weak liquor outlet 64; and conduit means including conduit 58 for conducting strong liquor from analyzer into the lifting conduit 60 where it flows up to the lift-level, conduit 67 for feeding generated vapor under pressure downwardly from the generator vapor space into the lifting orifice 61 to lift the strong liquor through said lifting conduit 60 into the said separator vapor space, conduit 52 for conducting a solid column of down-flowing strong liquor from the separator 50 and discharging it into the generator 63 at a level below the generator level and conduit 53 for conducting separated vapor under pressure from the separator vapor space to the analyzer vapor inlet 55 through which it flows to pass upwardly through the strong liquor to said vapor outlet.

Structure of Figures 3 and 4

The separator 50 comprises a shell 50 having a strong liquor operating or separator level, a closed vapor space over that level, an inlet opening 51 for receiving strong liquor and generated vapor, a strong liquor discharge conduit 52 depending from its bottom and a vapor discharge conduit 53 for conducting the separated vapor from the closed vapor space to the analyzer 54.

The analyzer 54 is in the form of an inclined tube 54 providing a path for the flow of vapor from a vapor inlet 55 upwardly to an analyzed vapor outlet level A at which the analyzed vapor leaves the liquor circuit to enter a vapor feed conduit 56 leading to the refrigerant condenser not shown. The strong liquor for analyzing this vapor enters the upper end of the analyzer through a strong liquor inlet 57, flows downwardly through the analyzer tube 54 in countercurrent relationship to the vapor, and leaves the lower end of the analyzer to pass through an outlet liquor conduit 58 which connects with the lower end of the lifting conduit 60.

The lifting conduit 60 is in the form of a vertical tube 60 extending upwardly from its lower end connection to conduit 58, with its upper end connected to the inlet opening 51 of separator 50. This conduit has a strong liquor operating or lift-level at the level of the analyzer vapor inlet 55 and a lifting vapor inlet orifice 61 below this lifting level but sufficiently above the lower end of the lifting tube 60 to prevent vapors entering the orifice 61 from passing downwardly to flow through conduit 58.

The generator 63 comprises a horizontal shell 63 having a combustion tube 62 passing centrally therethrough, a weak liquor outlet tube 64 at one end and a standpipe 65 at its other end. The weak liquor outlet tube 64 extends from the generator centrally through the analyzer tube 54. The generator is so arranged that all vapor generated in it travels toward and collects in standpipe 65 which has an operating liquid or generator level at an elevation above that of the lift orifice 61 and below that of the separator level, a closed vapor space over the generator level, a generated vapor outlet opening 66 and a vapor discharge conduit 67 leading from the generator vapor outlet 66 downwardly to discharge through the orifice 61 into the lifting conduit 60. Preferably, the separator shell 50 and the standpipe 65 are made as one integral shell with a partition 68 dividing that shell into the upper separator chamber and lower standpipe or generator chamber, this partition supporting the strong liquor discharge conduit 52 which depends downwardly into the standpipe to an elevation well below that of the normal generator level.

The heat exchanger, which connects the generator and absorber assemblies together, comprises an outer strong liquor tube 70 extending upwardly from the discharge conduit 8 of the receiver 6 to the strong liquor inlet 57 of the analyzer 54 and connected to both; and a weak liquor tube 71 extending centrally downward through the strong liquor tube 70 with its upper end connected through vent connector 72 to the upper end of the weak liquor generator outlet tube 64, and with its lower end connected to weak liquor conduit 1 leading to the absorber. The vent connector projects upwardly from its connection with tube 64 beyond the weak liquor vent level and communicates through vapor conduit 73 with the vapor conduit 53 between the separator and analyzer.

Operation of Figures 3 and 4

The operations of the arrangements shown in Figures 3 and 4 are identical with each other. They are substantially the same as that of Figure 2, the only difference being that the vent conduit of Figures 3 and 4 is connected to the separator chamber discharge conduit 73 placing the vent level under the separated vapor pressure whereas the vent level in Figure 2 is not under pressure.

In Figures 3 and 4 strong liquor flows from receiver level R through conduit 8, the outer heat exchange conduit 70, the analyzer 54, which establishes the lower level A, and conduit 58 into the lift conduit 60. At the same time, generated vapor under pressure comes from the vapor space of the generator standpipe 65 through its discharge opening 66 and discharge conduit 67 to enter the lifting conduit 60 through orifice 61. The lifted liquid enters the separator 50 where the vapor and liquid separate. The separated vapor builds up pressure until it overcomes the hydrostatic head at the analyzer vapor inlet 55 whereupon it passes upwardly through the analyzer in countercurrent relationship to the downflowing strong liquor and discharges from the analyzer level A to pass into conduit 56 which conducts it into the condenser not shown.

The separated strong liquor in separator 50 passes through downpipe 52, generator 63, weak liquor tube 64 to enter vent connector 72 from which it flows through weak liquor tube 71 of the heat exchanger and conduit 1 back to the inlet section 3 of absorber 4.

Any entrained vapor in the weak liquor flowing to or from the vent connector 72 and any noncondensible gases in such weak liquor pass upwardly through the vent connector 72 discharging into conduit 73 and passing to conduit 53 where it joins the separated vapor entering the analyzer.

In order to bring out the features incorporated in Figures 3 and 4, reference will now be made to the schematic views of Figures 5, 6 and 7. All elevations are stated herein with reference to the same zero reference line.

Figure 5

Figure 5 is a schematic view based on Figure 3 except that vapor pressure is not built up in the separator, the vapor and gases from the separator and vent connector being surface analyzed in the analyzer before going to the condenser. In Figure 5, we assume: a $6\frac{3}{4}''$ receiver level R; a flow resistance drop of $\frac{1}{4}''$ from the receiver through the heat exchanger to a low level in the analyzer of $6\frac{1}{2}''$; and a negligible drop from the analyzer through conduit 58 to a lift level in conduit 60 of $6\frac{1}{2}''$.

With a $1\frac{7}{8}''$ drop in the absorber between level I and the $6\frac{3}{4}''$ level R, the level I is established at $8\frac{5}{8}''$. In order to make liquor flow from the vent connector through the heat exchanger to an absorber level I of $8\frac{5}{8}''$, with a flow resistance drop in the heat exchanger of $\frac{1}{4}''$, the vent level must be $8\frac{7}{8}''$ and, to provide an excess head of $\frac{7}{8}''$ as a safety feature, the required vent level becomes $9\frac{3}{4}''$. The difference in density between the lighter strong liquor flowing from the separator and the heavier weak liquor flowing into the vent connector requires the separator level to be ¼" higher than the vent level thus establishing the separator level at 10".

Under the conditions assumed, the 10" separator level is not depressed and, therefore, stands at the same elevation as the high level while a lift height of 3½" is established between the low level A and the high level.

To lift low level liquid to the high level separator, vapor is generated under pressure and introduced into the orifice 61. The lowest safe elevation of the orifice is approximately 1" above the lowest point to which such vapor must flow before it can reverse its normal direction of travel. Since such lowest point is on the zero reference line for these elevations, the orifice can be and is placed at an elevation of 1".

The hydrostatic pressure at the orifice level is 5½"; hence the vapor pressure of the generator is equivalent to this 5½" hydrostatic pressure. This automatically places the generator level 5½" below the high separator level or at an elevation of 4½" above the reference line. The generator vapor outlet 66 should be placed at least ¾" above the generator level in order to avoid any possibility of generated liquid being carried into the lifting conduit.

With 5½" of generator pressure, liquid is lifted into the separator and the separator level will rise until equilibrium flow conditions are established. It may be that equilibrium flow conditions will be established in actual operation before any part of the ⅞" excess head is utilized or when only a portion of it is required. In such event, the separator level will not rise to the 10" level but, on the contrary, may stop at some value such, for example, as 9½". In such case, the actual lift height will be 3" instead of the assumed 3½". The generator level will move to the 4" elevation because a rise or fall in the separator level will be accompanied by a corresponding and equal rise or fall in the generator level, the 5½" generator vapor pressure remaining unchanged. For the sake of clarity, we shall hereinafter assume that the lift height actually required remains at 3½".

With the orifice 5½" below the 6½" lift level, the establishment of proper flow relationship, from flow ratio R, requires the lift conduit 60 to extend upwardly from the lift-level a distance approximating 7⅞". This places the inlet 51 of the separator at an elevation approximating 14¾" so that the total elevation of the separator necessarily approximates 14½" to 15".

As indicated in Figure 5, the generator-separator shell projects substantially above the remainder of the generator assembly. Where the generator is placed below the food compartment, it is desirable to reduce the overall height of the generator assembly because it enables the food compartment of a refrigerating unit of given height to be correspondingly enlarged vertically or alternatively permits the overall height of an equivalent refrigerating unit to be correspondingly reduced.

To effect a reduction in the height of the generator assembly, I take advantage of the fact that a back pressure can be built up in the separator to drop the actual liquid level while maintaining the same hydrostatic pressure. This is illustrated by Figure 6.

*Figure 6*

In Figure 5 the separated vapor does not act against any liquid head in the analyzer. In Figure 6 the separated vapor is made to act against a hydrostatic head in the analyzer to build up a corresponding vapor pressure in the separator. Accordingly, the vapor inlet of the analyzer is dropped 1" below the 6½" low level A of the analyzer so that the separated vapor must build up a vapor pressure equal to this 1" column of liquor in the analyzer before vapor can discharge through the analyzer. With this change: the I and R levels of the absorber assembly and the high, low, generator and orifice levels of the generator assembly all remain unchanged, whereas the separator, vent and lift levels of the generator assembly are all depressed 1" by the pressure of the separated vapor.

Since the lift level of the generator assembly has been depressed 1", the length of the lifting conduit from the lift level to the separator should be and is reduced, in accordance with flow ratio R, approximately to 6½". Accordingly, the lifting conduit extends, from the reference line, upwardly 1" to the orifice level, 4½" more to the lift level and 6½" more to the 12" level where it discharges into the separator. This makes it possible to reduce the height of the generator assembly to an elevation which is slightly above 12", say 12½". Thus the assembly of Figure 6, with 1" separated vapor pressure, is approximately 2½" shorter than that of Figure 5.

In Figure 6 the vapor inlet of the analyzer was lowered for vapor pressure purposes but located slightly above the generator vapor outlet 66 for charging and recharging purposes as will be explained hereinafter. The fact that the analyzer vapor inlet of Figure 6 is positioned above the generator vapor outlet 66 limits the amount of vapor pressure which can be developed in the Figure 6 arrangement while maintaining the same reduced height unless some other means of restricting the flow of separated vapor is provided. Without such other means, the only way of increasing the separated vapor pressure of Figure 6 is to lower the analyzer inlet still further. This is essentially what is done in Figure 7.

*Figure 7*

In Figure 7, the lowering of the analyzer inlet below the generated vapor outlet 66, makes it possible to lower the analyzer itself, until the low level A formed by it is slightly above the generator vapor outlet 66 and still enable the system, once it is properly charged, to recharge itself automatically, after inversion, as will be hereinafter explained.

Accordingly, in Figure 7, the entire analyzer is lowered 1" to place the low level A at the 5½" level where it stands ¼" above the generator vapor outlet 66. This enables the receiver level R in the low circuit, the absorber level I in the high circuit, and the high, separator and vent levels in the high circuit, all to be lowered 1". The lowering of these levels enables the height of the generator assembly to be correspondingly reduced but it does not have any effect on the separator vapor pressure.

To provide a separator vapor pressure of greater magnitude in Figure 7 than is obtained in Figure 6, the analyzer vapor inlet must be lowered more than 1". As shown, it is lowered 1 11/16" below the low level A; hence the separator, vent and lift levels are now depressed 1 11/16" by the separator vapor pressure. The lowered analyzer inlet stands at an elevation of 3 13/16" which brings the lift level down to the same elevation. With this reduction, the length of the lifting conduit from the lift-level to its discharge level is reduced to 4" more or less permitting the lifting conduit to connect into the separator at an elevation of 7 13/16" so that the overall height of the generator assembly approximates 8" which is 7" and 4½" shorter than the assemblies of Figures 5 and 6 respectively.

*Recharging feature of Figures 3 and 4*

The refrigerating apparatus illustrated in this application is assumed to be, and is explained as, one utilizing ammonia, hydrogen and water system although any other suitable system may be employed. Each of the circulating systems of Figures 3 and 4 may be and preferably is charged by first exhausting the system, next introducing the ammonia solution or strong liquor into the receiver and finally introducing the hydrogen gas. As the strong liquor is introduced into the receiver, it passes through the low circuit into lift tube 60 where it also floods through orifice 61 rising upwardly through both conduits 60 and 67.

When the level in these conduits reaches the level of standpipe opening 66, the liquid will overflow into the standpipe and begin to build up a level in the horizontal section of generator 63. Ammonia will begin to evaporate from the liquid in generator 63 and the gases thus formed will escape through conduit 64 back to the absorber until the generator connection to conduit 64 is sealed by liquid and through conduit 52, either to conduit 56 through the analyzer 54 or back to the absorber through conduit 73 until the lower end of the downpipe 52 is sealed off by liquid.

By the time the lower end of downpipe 52 is sealed off by liquid, the generator has sufficient liquid in it to seal off any entrance by hydrogen. As a result the hydrogen pressure will compress the vapor in the generator proper causing it to condense into the solution and thereby permit the liquid level in the generator to rise. However, once the lower end of downpipe 52 is sealed off, the operation of the unit can be instituted simply by applying heat at the combustion tube.

Upon inverting the unit, the liquid in the absorber assembly will flow to the evaporator which is not shown while that in the analyzer will flow to the condenser which is not shown. However, the liquids in the generator and separator are trapped since these liquids must, when the unit is inverted, flow upwardly to escape. As a consequence, when the unit is restored to its normal upright position, the trapped liquor in the generator and separator will be sufficient to charge the generator to the degree required to start normal operation.

Having described my invention, I claim:

1. A generator assembly for uniform pressure absorption type refrigerating apparatus of the character wherein liquor flows through a low circuit from an absorber assembly to a low level in a generator assembly where it is lifted to flow through a high circuit from a downflow column in the generator assembly to a delivery level in the absorber assembly comprising: a low circuit analyzer for holding strong liquor up to the normal low or analyzer level of the low circuit, said analyzer having a vapor outlet above and a vapor inlet substantially below said level and strong liquor inlet and outlet openings positioned to accommodate a downflow through the analyzer of strong liquor received from the absorber assembly; a vertically arranged lifting conduit having its lower end connected to receive strong liquor from the analyzer strong liquor outlet up to a lift level which is depressed below said analyzer level, said lifting conduit having a vapor inlet orifice below its lift level; a high circuit separator for holding strong liquor of said high circuit downflow column up to a depressed separator level, said separator having, over its level, a closed vapor space connected to the upper end of the lifting conduit to receive strong liquor and vapor therefrom and a vapor outlet for that space, and, below its level, a strong liquor outlet; a high circuit generator for holding liquid up to a depressed generator level which is above the lifting conduit orifice and below the analyzer level, said generator having, over its level, a closed vapor space and a vapor outlet for that space; a downflow vapor conduit directing vapor under pressure from the generator vapor outlet downwardly and discharging it into the lift conduit orifice against the pressure head at that orifice; a downflow vapor conduit directing vapor under pressure from the separator vapor outlet downwardly and discharging it into the analyzer vapor inlet against the pressure head at that inlet; and a downflow liquor conduit connecting the separator strong liquor outlet to the generator below the depressed generator level.

2. The assembly of claim 1 wherein the analyzer low level is below the separator level and above the level of the generator vapor outlet.

3. The assembly of claim 2 wherein the analyzer vapor inlet is below the separator level and above the level of the generator vapor outlet.

4. The assembly of claim 1 wherein the analyzer low level is above the level of the generator vapor outlet and the analyzer vapor inlet is below the level of the generator vapor outlet but above the level of the orifice.

5. The assembly of claim 2 wherein the analyzer low level is on a horizontal plane adjacent the topside of the generator vapor outlet.

6. The assembly of claim 1 wherein the bore of the lifting conduit is substantialy uniform from the orifice to the horizontal level at which it discharges into the separator and the ratio of the distance between the orifice and the lift level to the distance between the lift level and said horizontal discharge level is not substantially above .80 or substantially below .60.

7. An improvement in a generator assembly for uniform pressure absorption type refrigerating apparatus of the character wherein one continuous stream of liquid flows through a high circuit from a generator assembly downflow column to the inlet of the absorber assembly and another continuous stream of liquid flows through a low circuit from the absorber assembly outlet to a low level in the generator assembly comprising: a high circuit separator containing relatively cool strong liquor forming the upper end of said high circuit downflow column which extends up to a vapor depressed separator level and which has the high pressure head required for circulation purposes, said separator having a closed vapor space over said level; a high circuit generator arranged in series with said separator to receive strong liquor from the downflow column of the separator, to heat said liquor and boil vapor therefrom as it passes through the generator and to deliver weak liquor, said generator having a vapor depressed generator level substantially below the separator level and a closed vapor space over said generator level; means for lifting strong liquor from the low level liquid in the low circuit upwardly into the high circuit separator, said means including a lift tube and a vapor pressure tube, said lift tube being arranged to receive strong liquor up to a vapor depressed lift level and to conduct it into said separator, said lift tube having a vapor inlet orifice substantially below the lift and generator levels, said vapor pressure tube being arranged to receive vapor under pressure from the generator vapor space, conduct it downwardly and deliver it into said lift tube orifice against the pressure head existing at the orifice; a low circuit analyzer for holding strong liquor from the absorber up to the normal or low analyzer level of the low circuit, said analyzer accommodating a downflow of strong liquor from an inlet which receives it from the absorber assembly to an outlet which delivers it to the lifting means, said analyzer having a vapor outlet above its low level and a vapor inlet substantially below said low level; and means directing the vapor from the high circuit separator vapor space downwardly and ultimately discharging it into said lower analyzer vapor inlet against the pressure head existing at said inlet.

8. The assembly of claim 7 wherein: the analyzer low level is located at an elevation not higher than the separator level nor lower than the top side of the connection between the vapor pressure tube and the generator vapor space.

9. A generator for absorption systems for distilling a refrigerant vapor and providing circulation of liquor from the low circuit low liquid level in the generator assembly to the high circuit delivery level in the upper portion of the absorber, comprising: a boiler with a heating tube passing therethrough and partitioned at the cooler end of the boiler into a lower high circuit chamber which extends toward the hot end of the boiler and an upper low circuit chamber; a vapor lift, including a vapor-collecting dome submerged below the level of the low circuit chamber, for pumping liquor from the low circuit chamber upwardly by vapor generated in the high circuit chamber and collected in the dome of the vapor lift; a separator and pressure chamber submerged in the liquid of the low circuit chamber for separating the vapor and liquid delivered thereto by the vapor pump and having a tube to discharge the vapor into the cooler rich liquor of the low circuit chamber, at a substantially lower level than the separator, to pass therethrough for rectification and cooling and for directing the separated liquor into the high circuit chamber through which it is forced by the pressure developed in said separator chamber; and a passageway leading from the hot end of the boiler for taking the weak liquid and elevating it to the upper portion of the absorber due to the difference in liquid levels arising from the pressure accumulating in the separator chamber and then made effective against the liquid in the high circuit chamber.

10. The combination claimed in claim 9 in which the vapor-collecting dome of the vapor lift is located at the partition between the high and the low circuit chambers.

11. The combination claimed in claim 9 in which the vapor-collecting dome of the vapor lift is located at the partition between the high and the low circuit chambers and at a high point in the high circuit chamber and is provided with a downgoing vapor feed tube which leads to the vapor orifice at the lower end of the vapor lift tube passing into the separator.

12. The combination claimed in claim 9, in which the vapor-collecting dome of the vapor lift is located at the partition between the high and the low circuit chambers and at a high point in said high circuit chamber and is provided with a downgoing vapor feed tube which leads to the vapor orifice at the lower end of the vapor lift tube passing into the separator, which separator is located in the low circuit chamber above the high circuit chamber.

13. The combination claimed in claim 9 in which the vapor-collecting dome of the vapor lift is located at the partition between the high and the low circuit chambers and at a high point in the high circuit chamber and is provided with a downgoing vapor feed tube which leads to the vapor orifice at the lower end of the vapor lift tube passing into the separator, which separator is located in the low circuit chamber above the high circuit chamber, the said separator being provided with a downwardly directed vapor discharge tube for discharging the separated vapor at a lower point in the low circuit chamber of the generator to permit the vapor to rise in said chamber in countercurrent to the incoming cool rich liquor from the absorber and to form a vapor piston to transmit the gravity pressure of the liquid column in the upper low circuit chamber to the fluid in the separator.

14. The combination claimed in claim 9 to which is added a weak liquor jacket secured around the boiler and having a passage connected with the hot end of the boiler for delivery of the weak liquor from the hot end of the boiler through the jacket to a discharge tube leading to the absorber.

15. The combination claimed in claim 9 to which is added a weak liquor jacket secured around the boiler and having a passage connected with the hot end of the boiler for delivery of the weak liquor from the hot end of the boiler through the jacket to a discharge tube leading to the absorber, the said jacket having a vent tube leading up above the lower liquid level of the boiler to the vapor discharge space.

16. The combination claimed in claim 9 in which the boiler has an upstanding portion and at its lower end a lateral extension with an elbow-like heater tube passing through the lateral extension and the upstanding portion of the boiler.

17. The combination claimed in claim 9 in which the boiler has an upstanding portion and at its lower end a lateral extension with an elbow-like heater tube passing through the lateral extension and the upstanding portion of the boiler, and in which a partition in the upstanding portion provides an upgoing leg for the lower high circuit chamber and a downgoing leg for the upper low circuit chamber.

18. The combination claimed in claim 9 in which the boiler has an upstanding portion and at its lower end a lateral extension with an elbow-like heater tube passing through the lateral extension and the upstanding portion of the boiler, and in which a partition provides an upgoing leg for the lower high circuit chamber and a downgoing leg for the upper low circuit chamber, the vapor-collecting dome of the vapor lift being located at the top of the upgoing leg of said high circuit chamber, and the vapor separator being located above the partition in said low circuit chamber, and having a downgoing vapor discharge leg, the vapor-collecting dome having a downgoing leg for conveying the vapor from said dome to the orifice in the vapor lift tube, the vapor lift tube and the two downgoing legs all being located in a downgoing leg of the upper low circuit chamber of the boiler, said vapor separator having a downgoing liquid discharge leg passing through the upgoing leg of the lower high circuit chamber for discharging liquid from the separator chamber into said high circuit chamber under pressure.

19. A generator for absorption systems for distilling a refrigerant vapor and providing circulation of liquor from the low circuit low liquid level in the generator assembly to the high circuit delivery level in the upper portion of the absorber, comprising: a boiler with a heating tube passing therethrough and partitioned at the cooler end of the boiler into a high circuit chamber which extends towards the hot end of the boiler and a low circuit chamber; a vapor lift wholly submerged in the low circuit chamber for pumping liquor from the low circuit chamber upwardly by vapor generated in the high circuit chamber and collected in the dome of the vapor lift; a separator and pressure chamber wholly submerged in the low circuit chamber for separating the vapor and liquid delivered thereto by the vapor pump and directing the vapor into the cool rich liquor of the low circuit chamber to pass therethrough for rectification and cooling and for directing the separated liquor into the high circuit chamber through which it is forced by the pressure developed in said separator chamber; and a passageway leading from the hot end of the boiler for taking the weak liquor and elevating it to the upper portion of the absorber due to the difference in liquid levels in the high and low liquid level chambers arising from the pressure accumulating in the separator chamber and made effective against the liquid in the high circuit chamber; the said boiler having an upstanding portion and a partition dividing the boiler into an upper low circuit chamber having a depending leg and a lower high circuit chamber having an upgoing leg.

20. A generator for absorption systems for distilling a refrigerant vapor and providing circulation of liquor from the low circuit low liquid level in the generator assembly to the high circuit delivery level in the upper portion of the absorber, comprising: a boiler with a heating tube passing therethrough and partitioned at the cooler end of the boiler into a high circuit chamber which extends toward the hot end of the boiler and a low circuit chamber; a vapor lift wholly submerged in the low circuit chamber for pumping liquor from the low circuit chamber upwardly by vapor generated in the high circuit chamber and collected in the dome of the vapor lift; a separator and pressure chamber wholly submerged in the liquid of the low circuit chamber for separating the vapor and liquid delivered thereto by the vapor pump and directing the vapor into the cool rich liquor of the low circuit chamber to pass therethrough for rectification and cooling and for directing the separated liquor into the high circuit chamber through which it is forced by the pressure developed in said separator chamber; and a passageway leading from the hot end of the boiler for taking the weak liquor and elevating it to the upper portion of the absorber due to the difference in liquid levels in the high and low circuit chambers arising from the pressure accumulating in the separator chamber and made effective against the liquid in the high circuit chamber; the said boiler having an upstanding portion and a partition dividing the boiler into an upper low circuit chamber having a depending leg and a lower high circuit chamber having an upgoing leg; the vapor-collecting dome of the vapor lift being located at the top of an upgoing leg of the lower high circuit chamber and having a depending vapor feed tube for taking the vapor from the dome down to the inlet orifice of the vapor lift tube, which vapor lift tube is located in the downgoing leg of the upper circuit chamber; and the said vapor separator being located in the upper portion of said low circuit chamber and having a downgoing vapor discharge tube or leg located in a downgoing leg of said low circuit chamber.

21. In an absorption refrigeration system: an absorber; a generator; conduits connecting the same for circulating the rich liquor from the absorber through a low circuit to the generator by gravity and the weak liquor from the generator through a high circuit to the absorber at an elevated point in the absorber; the said generator being compartmented to provide an upper low circuit chamber and a lower high circuit chamber; a separator extending above the liquid level of said high circuit chamber; and a vapor lift pump for lifting low level liquid into said separator, said pump including a lift tube in the upper low circuit chamber and a dome providing a lifting-vapor-collecting space located in the lower high circuit chamber over the liquid level thereof; the said separator having a vapor discharge tube extending downwardly in the upper low circuit chamber thereby causing the hydraulic column in said upper low circuit chamber to have its pressure head, at the lower end of said vapor discharge tube, lifted to a higher point by the vapor in said discharge tube for application through the fluid in the separator to the hydraulic column in said lower high circuit chamber whereby to establish a higher head for the liquid of said lower high circuit chamber for the purpose of causing the weak liquor to pass through the high circuit conduits to the upper portion of the absorber.

22. In an absorption refrigeration system: an absorber; a generator; conduits connecting the same for circulating the rich liquor from the absorber through a low circuit to the generator by gravity and the weak liquor from the generator through a high circuit to the absorber at an elevated point in the absorber; the said generator being compartmented to provide an upper low circuit chamber and a lower high circuit chamber; a separator extending above the liquid level of said high circuit chamber; a vapor lift pump for lifting low level liquid into said separator, said pump including a lift tube in the upper low circuit chamber, a dome providing a lifting-vapor-collecting space located in the lower high circuit chamber over the liquid level thereof and a vapor discharge tube extending downwardly from said dome into said lifting tube; the said vapor-collecting dome and vapor discharge tube thereby causing the hydraulic column in the upper chamber to have its pressure head, at the lower end of said discharge tube, lifted to a higher point by the vapor in said discharge tube for application through the fluid in the dome to the hydraulic column in said lower high circuit chamber whereby to establish a higher head for the liquid of said lower high circuit chamber for the purpose of causing the weak liquor to pass through the high circuit conduits to the upper portion of the absorber.

23. In an absorption refrigeration system: an absorber; a generator; conduits connecting the same for circulating the rich liquor from the absorber through a low circuit to the generator by gravity and the weak liquor from the generator through a high circuit to the absorber at an elevated point in the absorber; the said generator being compartmented to provide an upper low circuit chamber and a lower high circuit chamber; a separator extending above the liquid level of said high circuit chamber; a vapor lift pump for lifting low level liquid into said separator, said pump including a lifting tube in the upper low circuit chamber with a dome providing a lifting-vapor-collecting space located in the lower high circuit chamber over the liquid level thereof; the said vapor-collecting dome and separator having vapor discharge tubes extending downwardly in the upper chamber and discharging thereinto against the pressure head thereof thereby causing the hydraulic column in the upper low circuit chamber to have its pressure head, at the lower ends of said discharge tubes, lifted to higher points by the vapor in said discharge tubes for application through the fluid in the separator and the dome to the hydraulic column in said high circuit chamber for the purpose of causing the weak liquor to pass through the high circuit conduits to the upper portion of the absorber.

WALTER L. EDEL.

REFERENCES CITED

The following references are of record in the file of this patent:

UNITED STATES PATENTS

| Number | Name | Date |
| --- | --- | --- |
| 1,664,471 | Von Platen et al. | Apr. 5, 1928 |
| 1,791,441 | Bertsch | Feb. 3, 1931 |
| 2,020,654 | Nelson et al. | Nov. 12, 1935 |
| 2,080,195 | Bergholm | May 11, 1937 |
| 2,215,674 | Ullstrand | Sept. 24, 1940 |
| 2,337,653 | Ehnbom | Dec. 28, 1943 |